United States Patent
York et al.

[11] Patent Number: 6,154,226
[45] Date of Patent: Nov. 28, 2000

[54] PARALLEL PRINT ARRAY

[75] Inventors: Pamela K. York, Yardley, Pa.; Sterling E. McBride, Lawrenceville; Satyam C. Cherukuri, Cranbury, both of N.J.

[73] Assignee: Sarnoff Corporation, Princeton, N.J.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/939,769

[22] Filed: Sep. 29, 1997

Related U.S. Application Data

[60] Provisional application No. 60/046,292, May 13, 1997.

[51] Int. Cl.[7] .................................................. G01D 15/16
[52] U.S. Cl. ............................ 346/140.1; 347/55; 417/50
[58] Field of Search ........................... 346/140.1; 347/55, 347/47; 417/48, 50

[56] References Cited

U.S. PATENT DOCUMENTS

| | | | |
|---|---|---|---|
| 4,166,277 | 8/1979 | Cielo et al. ............................. | 347/55 |
| 4,220,958 | 9/1980 | Crowley ................................. | 347/75 |
| 4,263,601 | 4/1981 | Nishimura et al. ..................... | 347/55 |
| 4,922,265 | 5/1990 | Pan ........................................ | 347/47 |
| 5,263,601 | 4/1981 | Nishimura et al. ..................... | 347/55 |
| 5,632,876 | 5/1997 | Zanzucchi et al. .................... | 204/600 |
| 5,771,810 | 6/1998 | Wolcott ................................. | 101/483 |
| 5,858,193 | 1/1999 | Zanzucchi et al. .................... | 204/601 |
| 5,980,719 | 11/1999 | Cherukuri et al. .................... | 204/600 |

OTHER PUBLICATIONS

Beni, G.; Hackwood, S.; and Jackel, J.L.; 'Continuous electrowetting effect', "Applied Physics Letters", vol. 40, No. 10, pp. 912–914, May 1982.

Beni, g.; hackwood s.; and Jackel, J.L.; "continuous electrowetting effect", "Applied Physics Letters'" vol. 40, No. 10, pp. 912–914, May 1982.

*Primary Examiner*—N. Le
*Assistant Examiner*—Shih-Wen Hsieh
*Attorney, Agent, or Firm*—William J. Burke

[57] ABSTRACT

A print array that incorporates reservoir(s), microchannels and electrohydrodynamic (EHD) pumps for selectively dispensing fluid (ink) from the reservoir(s) onto the surface of a receptor.

25 Claims, 9 Drawing Sheets

PARALLEL PRINT ARRAY

This application claims the benefit of U.S. Provisional Application No. 60/046,292 filed May 13, 1997.

The invention relates to a print array and, more particularly, the invention relates to a multilayer print array that incorporates electrohydrodynamic (EHD) micropumps, microchannels and reservoir(s) to selectively dispense fluid from the reservoir(s) onto a receptor.

BACKGROUND OF THE DISCLOSURE

Current technology offers a variety of techniques to print information, e.g., text and images, onto a receptor, such as paper, Mylar sheet or coated material. Many of the printing techniques are based on the physical transport of a pigment or ink from a reservoir to a receptor in a controlled manner. For example, FIG. 1 illustrates a typical printing system 100, which can be represented by three broad parts: 1) a storage 110 for the pigment, 2) a transport mechanism 120 to deliver the pigment and 3) a receptor 130 to receive the pigment, e.g., a print media.

The storage 110 can be implemented in a number of different manners, e.g., a toner cartridge for a laserjet printer that carries pigment in powder form, an inkjet cartridge for an inkjet printer that carries liquid pigment or a print ribbon in a dot matrix printer.

Similarly, the transport mechanism 120 can be implemented in a number of different manners e.g., the formation and propulsion of droplets (or a spray of droplets) by mechanical means like thermal evaporation, acoustic waves or electrical means. Typically, the droplets exit the storage medium and travel a gap to reach the receptor. An example of droplets (or sprays) propulsion is illustrated by Choi et al., in Society for Imaging Science and Technology, pages 33–35, (1996), which incorporates electro-hydrodynamic (EHD) techniques for printing. An example of droplets formation is also illustrated by Crowley, U.S. Pat. No. 4,220,958 (Ink Jet Electrohydrodynamic Exciter).

However, current printing technology as discussed above are often components of a much larger system or they must be manipulated or serviced by a larger system to perform their primary function, which is printing. For example, the printhead or toner cartridge must reside within a printer. More importantly, the transport mechanism generally requires a significant amount of energy to perform properly, e.g., a high voltage is needed to evaporate droplets onto a paper. This limitation significantly reduces the portability of the printing device.

Therefore, a need exists in the art for a print array that is capable of forming precise droplets that can be dispensed onto a receptor in a high density formation with relatively low power.

SUMMARY OF THE INVENTION

The present invention is a method and apparatus for incorporating EHD micropumps, microchannels and reservoir(s) for selectively dispensing fluid(s) from the reservoir(s) to a receptor. More specifically, the apparatus is a print array (or printer cartridge) carrying the necessary drivers and stored fluids, where upon receipt of the appropriate control signal(s), selectively dispenses the stored fluids onto the surface of the receptor.

The print array comprises a plurality of layers or cartridges, e.g., a reservoir layer, a distribution layer and a dispensing layer. The reservoir layer carries one or more reservoirs filled with one or more types of pigment. The reservoir layer is bonded to the distribution layer that contains channels for directing the fluids from the reservoir layer to the dispensing layer. In turn, the distribution layer is bonded to the dispensing layer that contains a plurality of individually addressable micropumps (e.g., EHD micropumps) and orifices for dispensing the pigments onto a receptor.

These three layers are assembled to form a single unit, a print array. The print array is based on a high-density microfluidic array and reservoir system with electronic drivers to control micropumps, which serve as a droplets formation and dispensing mechanism.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
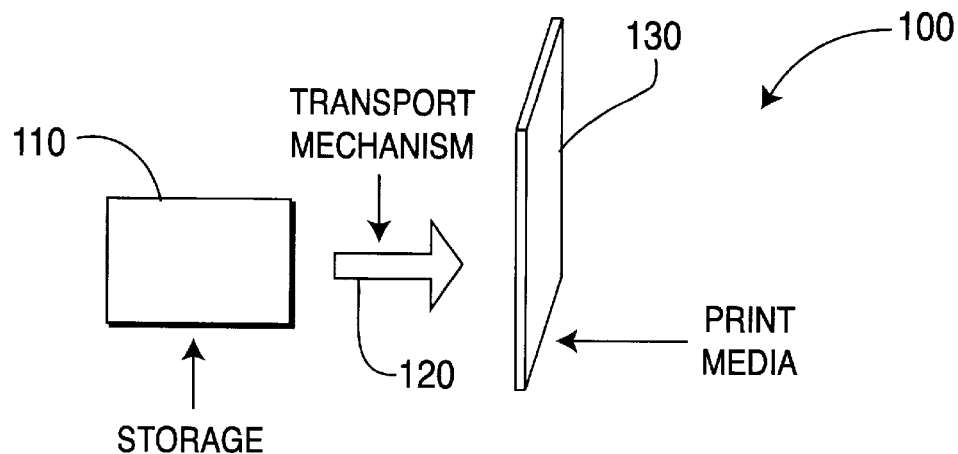
FIG. 1 depicts a prior art printing system.
Figure 2:
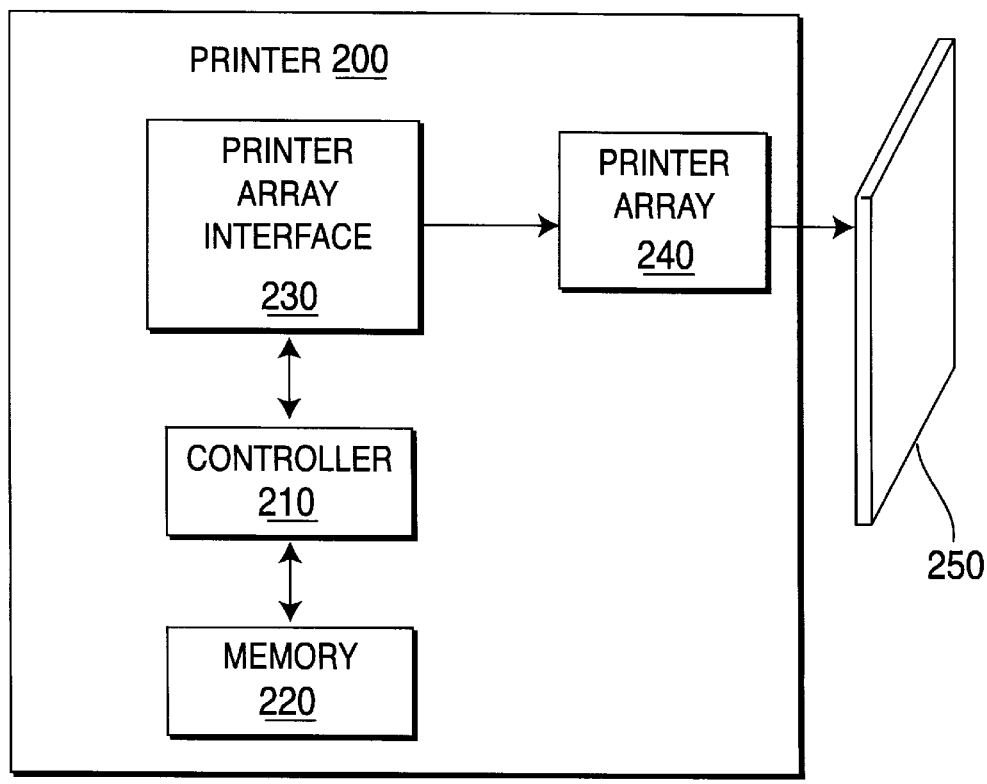
FIG. 2 depicts a block diagram of the print array of the present invention residing within a printer system.

FIG. 2 depicts a block diagram of a print array of the present invention residing within a printing system 200, e.g., a printer. The printer 200 may comprise a general purpose controller (processor, microcontroller, or ASIC) 210, a memory 220, a print array interface 230 and a print array 240.

The controller 210 controls the printing operation of the printer and can be designed to receive print commands from a number of different devices, e.g., a computer, an imaging device or a digital camera. In fact, the controller 210 is electrically coupled to the memory 220 which may be loaded with one or more software applications for controlling the printer and for communicating with the print array 240 via print array interface 230.

Print array interface (module) 230 serves as an interface for engaging the plurality of electrical contacts or connections located on the print array 240. These electrical connections provide the necessary signals for operating a plurality of micropumps, e.g., EHD micropumps (shown in FIGS. 4–7 below), which are employed to regulate the flow of fluids from the reservoirs within the print array 240 onto a surface of the receptor 250. The print array interface 230, which is electrically connected with the controller 210 and the print array 240, contains the necessary circuitry and connectors for selectively providing control signals from the controller to the EHD micropumps in the print array 240.

Figure 3:
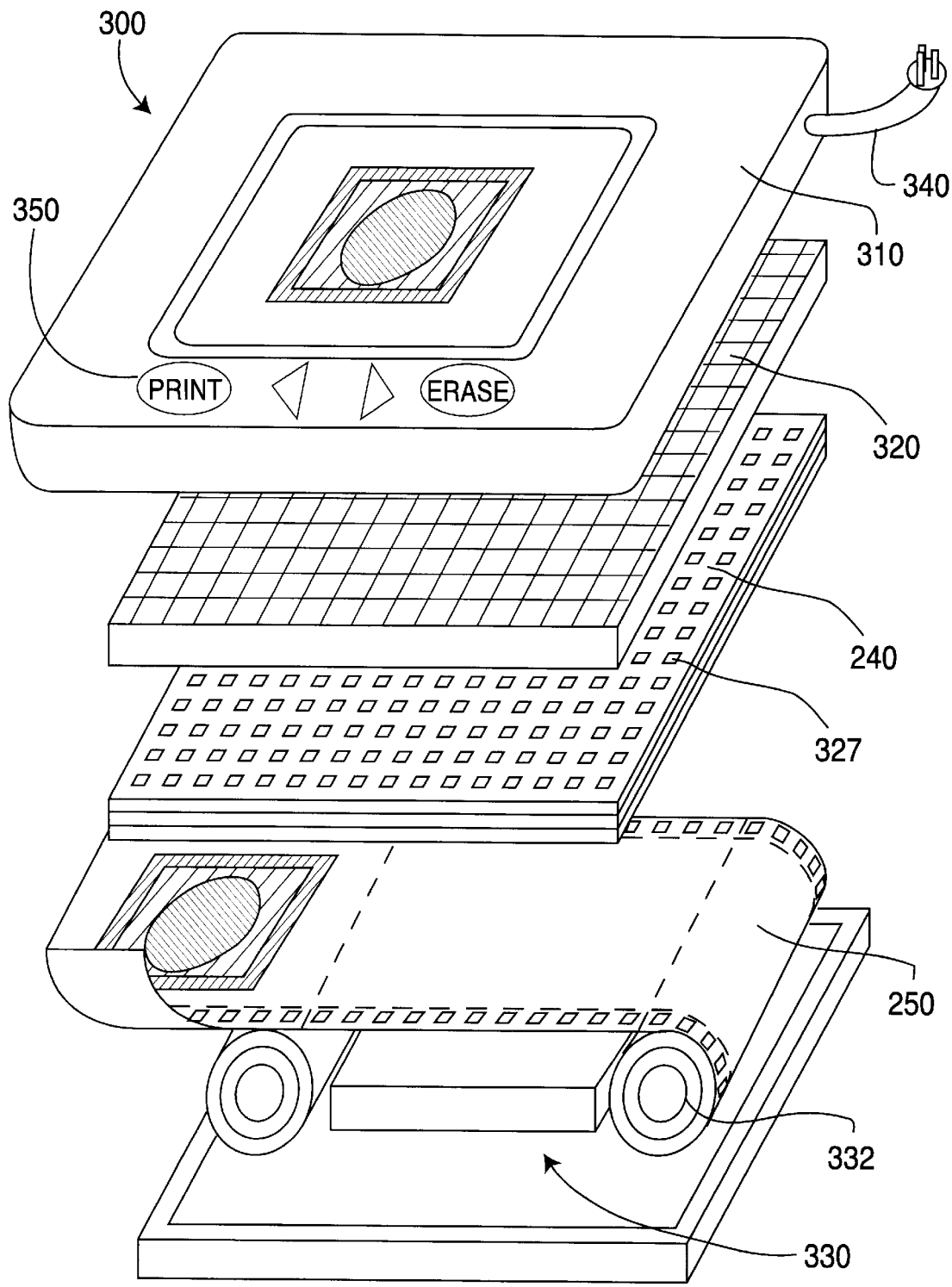
FIG. 3 illustrates one embodiment of the present print array which is incorporated within a portable printer.

FIG. 3 illustrates one embodiment of the present print array 240 which is incorporated within a portable printer 300. In this embodiment, the portable printer 300 may comprise the following devices: a display (e.g., a liquid crystal display (LCD)) 310, a printer interface module 320, a print array 240, a receptor support assembly 330, an interface connector 340 and various switches 350. The controller 210, memory 220 and a power source (e.g., batteries) are not shown in FIG. 3. Although the present invention offers various advantages that promote its use in a portable printer, it should be understood that the present invention is not so limited.

The interface connector 340 can be used to interface with an electronic photography device, e.g., an electronic camera. An electronic camera captures images as arrays of electrical charges using, for example, a CCD imager, and stores the images in the same way that a computer stores graphics. The stored images can be displayed on computer monitors or television screens in real time (i.e., in the field) using, for example, liquid crystal displays or (at a considerable energy penalty) small cathode-ray tubes. Based on the real-time display, the photographer can choose to keep or to erase a specific picture. The retained images are stored on computer-compatible memory devices that can be subsequently transferred to, processed by, and/or printed by computers or by a portable printer 300 as illustrated in FIG. 3.

The interface connector 340 passes the stored images from the electronic camera to the memory 220 of the portable printer 300, where the stored images can be recalled and reviewed by the user. The memory 220 in the portable printer has a suitable storage capacity to receive a plurality of stored images.

Thus, the portable printer 300 may comprise an optional display 310 which serves to display the stored images to the user. In addition, a plurality of illustrative function keys 350 are provided to allow the user to scroll forward and backward, print or erase a set of stored images.

When the user wishes to print a stored image, the control signals representative of the desired stored image are passed to the printer interface module 320. As discussed above, the printer interface module 320 serves as an interface for engaging the plurality of electrical connections or contacts 327 located on the print array 240. These electrical connections provide control signals to a plurality of EHD micropumps which are employed to regulate the flow of fluids (ink or pigment) from the reservoirs within the print array 240 to a location on the receptor surface, thereby forming the desired stored image on the surface of the receptor 250. Alternatively, the electrical connections or contacts 327 can be situated at the periphery (e.g., on two sides) of the print array, instead of being situated on one side of the print array as shown in FIG. 3.

Finally, FIG. 3 illustrates a receptor support assembly 330 that serves to support the receptor 250 against the print array 240. In this embodiment, receptor support assembly 330 incorporates a pair of rollers 332 for advancing a roll of receptors with perforation. The perforation allows a "printed" receptor to be easily torn away from the roll of receptors.

The rollers also serve to apply pressure and align the receptor against the print array 240, thereby causing the surface of the receptor to come into contact with the print array. Alternatively, the rollers may incorporate tracking teeth or guides (not shown) for engaging guide apertures (not shown) along the edges of the roll of receptors. Such tracking guides allow proper alignment of the receptor 250 with the print array 240. These tracking guides are commercially available. In addition, optional perforation can be implemented along the guide apertures so that they can be removed from the printed receptor.

However, the receptor support assembly 330 is not limited to a roller assembly implementation. In fact, the receptor support assembly 330 can be implemented using a spring loaded dispensing cartridge carrying a stack of receptors, e.g., similar to an instant film pack for instant cameras.

Figure 4:
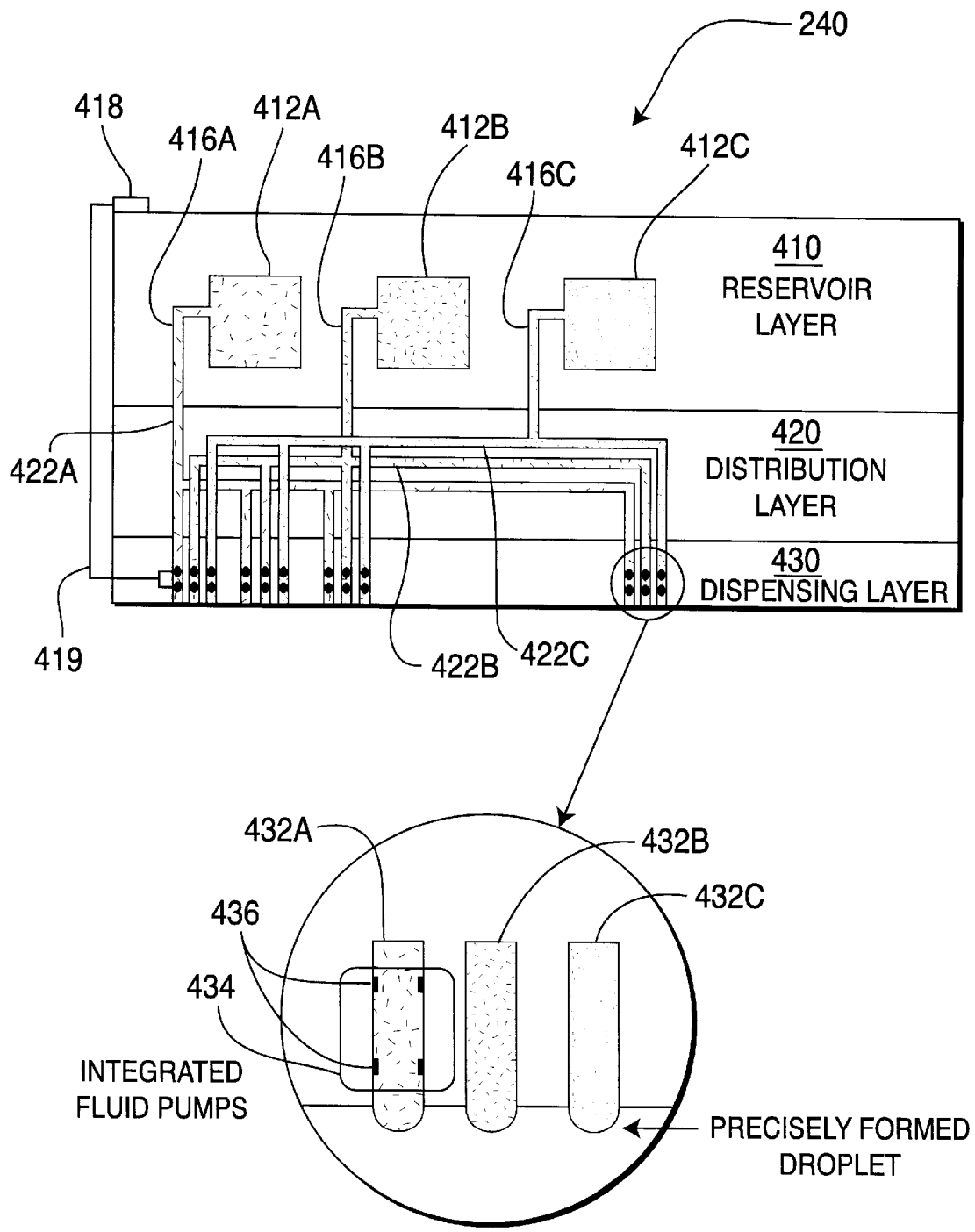
FIG. 4 depicts a sectional view of the present microfluidic print array.

FIG. 4 depicts a sectional view of one embodiment of the present microfluidic print array 240, which is comprised of a high-density array of reservoirs, capillaries, fluid dispensing apertures, integrated micropumps, and integrated pump drivers. More specifically, the print array 240 of the present invention is a multilayer fluidic print array having reservoir (s) of pigment, connecting microchannels, EHD micropumps (microfluidic pumps) and dispensing orifices or apertures etched into a substrate. Microfluidic pumps and microfluidic pumping methods are disclosed for example in U.S. Pat. No. 5,585,069 issued Dec. 17, 1996, in U.S. Pat. No. 5,630,351 issued Feb. 18, 1997, Patent Cooperation Treaty Application Serial; No. 95/14590 filed Nov. 9, 1995, and Patent Cooperation Treaty Application Serial No. 95/14586 filed Nov. 9, 1995. The disclosure of each of these patents and patent applications is incorporated herein by reference.

In one embodiment, the print array 240 comprises three distinct modules, layers or plates. It should be understood that each module or layer may comprise, in turn, sublayers or subplates as discussed below. Specifically, print array 240 comprises a reservoir layer 410, a distribution layer 420 and a dispensing layer 430. The three layers are stacked vertically and coupled together to form a liquid-tight seal. In the preferred embodiment of the present invention, the various layers are bonded or fused by thermal bonding or anodic bonding or other suitable bonding techniques.

In the preferred embodiment, the layers of the print array are preferably made from glass or a combination of glass and silicon. However, other suitable materials include fused silica, quartz, plastics, or flexible elastomeric materials such as Corning "Sylgard 184". The selection of the material for the print array 240 can be tailored for a particular type of fluid or implementation, e.g., various types of ink may exhibit different flow characteristics in a different material. For example, glass possesses insulating properties, which will permit the insertion of micropump electrodes in close proximity through the dispensing layer, thereby permitting the construction of a high density print array (as discussed below in FIGS. 9–11). Furthermore, it should be noted that many organic solutions dissolve plastic. As such, glass may also be suitable where the pigments are organic based.

The layers of the print array are suitably about 2 inches by 3 inches with a thickness of about 1 millimeter. The reservoirs, microchannels and orifices are finely and controllably etched or drilled in the layers using modified semiconductor techniques with a suitable chemical or laser etchant, e.g., wet chemical etching, reactive ion etching, or excimer laser drilling.

The reservoir layer 410 comprises a plurality of prefilled reservoirs 412A–412C carrying one or more types of fluids, e.g., fluids with different pigments (color inks). In one embodiment, the fluid reservoir layer has the necessary reservoirs to house inks of red, green, blue, and optionally black (not shown), if desired. The reservoirs should be of sufficient volume to print a reasonable number of copies. These reservoirs would be factory-filled using specialized cartridge-filling machines designed for this purpose. The reservoir layer may contain an optional distribution system (416A–416C), which directs the fluids from the reservoirs to the distribution layer. Alternatively, as illustrated below in FIGS. 5 and 7, the reservoir layer can be implemented with only reservoirs, where the distribution system is confined within the distribution layer 420.

Additionally, suitable coating, e.g., a hydrophobic seal can be applied to the reservoirs to implement precise droplets formation and to prevent leaching or cross contamination of fluids between reservoirs or to prevent chemical reaction of the stored fluids with the material of the reservoir layer itself. Examples of a hydrophobic coating includes fluorocarbon polymers such as Teflon TFE or FEP, and surface-polymerized silicons.

Alternatively, the reservoir layer 410 may comprise a single reservoir (not shown) for carrying only one type of fluid, e.g., a black ink for printing gray-scaled images. In this embodiment, the cost and complexity of the print array can be significantly reduced, since only one reservoir is formed in the reservoir layer. Furthermore, the complexity of the distribution layer described below is also reduced through the reduction of the total number of microchannels.

In yet another alternate embodiment, the fluid reservoir layer 410 may further incorporate an optional feed (not shown), which provides the ability to refill a depleted reservoir. This refilling capability can extend the usable life of the print array 240. For example, a detachable reservoir pack (not shown) can be coupled to the print array 240 or the printer system may incorporate a much larger reservoir (not shown) for providing additional ink to the print array 240.

Returning to FIG. 4, the distribution layer 420 carries a distribution microchannel system (422A–422C). This distribution microchannel system allows a set of centralized reservoirs 412A–412C to provide fluids to a plurality of locations, i.e., apertures on the dispensing layer 430 of the print array 240.

The distribution layer 420 is made preferably from glass or similar material and is a three-dimensional fluid distribution system which enables the transfer of primary colors, e.g., red, green, blue (RGB) and optional black inks from the reservoirs to individual dispensing location without cross-contamination. A cross-section of such a system is illustrated schematically in FIG. 4., where, only red, green, and blue inks are shown. Microchannels connected to the red, green, and blue ink reservoirs distribute a single ink color to an entire row of dispensers located in the dispensing layer 430. In turn, integrated EHD micropumps 434 are used to activate the droplet formation at the exit of individual dispensers.

More specifically, FIG. 4 includes an enlarged section view of three dispensers 432A–432C carrying three different color inks. Each dispenser includes a fluid delivery element, e.g., an EHD micropump 434 that comprises a pair of electrodes 436. The EHD micropumps 434 are disposed within channels of capillary dimension, where the EHD micropumps effect the movement of the fluids by applying an electric field to the fluids through application of a difference of potential.

Although FIG. 4 illustrates the dispenser being implemented on a separate dispensing layer, it should be understood that dispensers or portions thereof, can be alternatively disposed within the distribution layer 420. Namely, each dispenser refers to a small length of microchannal having a fluid delivery element and an aperture. The microchannel in the dispenser may have a particular structure. Thus, if the fluid delivery elements are implemented within the distribution layer 420, the dispenser simply refers to a small length of microchannal with an aperture.

The EHD micropumps 434 are based on electrokinetic pumps, e.g., as disclosed by Dasgupta et al., see "Electroosmosis: A Reliable Fluid Propulsion System for Flow Injection Analysis", Anal. Chem. 66, pp 1792–1798 (1994) or other suitable pumps based on microelectromechanical systems (MEMS) such as reported by Shoji et al., "Fabrication of a Micropump for Integrated Chemical Analyzing Systems", Electronics and Communications in Japan, Part 2, 70, pp 52–59 (1989). EHD micropumps are also disclosed in "A Micromachined Electrohydrodynamic EHD Pump", Sensors & Actuators 29, 159–168 (1991).

It should be understood that the EHD phenomenon involves various forces. Thus, the term EHD micropump as used in the present invention includes micropumps that may operate under one or more forces, e.g., ectrokinetic (coulomb) forces such as electrophoretic and electro-osmotic forces, Kelvin polarization force, dielectric force and electrostrictive force.

More specifically, force density acting on a dielectric fluid can be expressed generally as:

$$F = qE + \vec{P} \cdot \nabla \vec{E} - \frac{1}{2}E^2 \nabla \varepsilon + \nabla \left[ \frac{1}{2} \rho \frac{\partial \varepsilon}{\partial \rho} E^2 \right] \quad (1)$$

where,
q=free space charge density
E=electric field
Σ=permittivity
P=polarization vector
ρ=mass density.

Equation (1) can be viewed as comprising four (4) different forces, where:
qE≡Coulomb force;
P•∇E≡Kelvin polarization force;
—½E²∇Σ≡dielectric or Korteweg-Helmholz force; and $$\nabla \left[ \frac{1}{2} \rho \frac{\partial \varepsilon}{\partial \rho} E^2 \right] \equiv \text{electrostrictive force.}$$

In general, the Coulomb force is responsible for electrophoresis and electro-osmosis. Namely, electrophoresis occurs when a coulomb force is applied to a particle or molecule that has a charge (e.g., DNA) in the bulk of the fluid. Whereas, electro-osmosis occurs when a coulomb force is applied to a charge layer formed at a solid-liquid interface, e.g., a sleeve or tube of charges along the inside surface of a microchannel.

The Kelvin polarization force generally exists where the electric field is nonuniform. As such, these nonuniformities generally exist at the edges of the electrodes, e.g., the periphery of two plates.

The dielectric or Korteweg-Helmholz force generally exists in the presence of a nonuniform medium, e.g., pigment dispersed in a fluid, while the electrostrictive force generally exists when the mass density changes, e.g., a compressible fluid. A detailed description of these forces is disclosed in *Continuum Electromechanic*, by James R. Melcher (1981) MIT Press.

Thus, the contribution from these forces can vary significantly from implementation to implementation, but micropumps operating under any of these forces are considered EHD micropumps. Furthermore, it should be understood that equation (1) only accounts for the EHD phenomenon and does not account for other factors such as fluid dynamics. Thus, those skilled in the art will realized that the present invention can be modified to account for effects from different EHD micropump configurations, different fluid characteristics and different materials used in the formation of the present print array.

To illustrate, if the micropump electrodes are separated farther apart, e.g., typically above 500 $\mu$m, and the fluid has free charges, e.g., an electrolyte solution, electro-osmotic forces contribute to a greater extent in the movement of the fluid than other forces.

In contrast, if the pump electrodes are positioned closer, e.g., typically between 200–500 $\mu$m, and the fluid does not have the charges, e.g., organic solvents like THF, forces acting on injected or induced charges contribute to the movement of the fluid.

Thus, since coulomb (electro-osmotic and/or electrophoretic), polarization, dielectric or electrostrictive forces are typically present to some extent, the present EHD micropump should be interpreted as electrofluidic pumps operating under one or all of these forces. Thus, depending on the behavior and composition of the fluids, suitable EHD micropumps can be selected and implemented to satisfy the requirement of a particular application that uses the present print array.

In fact, micropumps may operate under other phenomena, other than electrohydrodynamics, e.g., "electro-wetting". A description of the electro-wetting phenomenon can be found in "Continuous Electrowetting Effect", by G. Beni et al., Appl. Phys. Lett. 40 (10), May 14, 1982 and "Dynamics Of Electrowetting Displays", by G. Beni et al., J. Appl. Phys. 52(10), October 1981.

Returning to FIG. 4, the EHD micropump has a positive and a negative electrode. In the appropriate fluids, application of an AC or DC signal across a region of the fluid via the pump electrodes causes fluid to flow towards the dispenser. The AC/DC signal is applied via AMLCD-like drivers which are electrically connected to the EHD micropumps.

Furthermore, each dispenser is addressable via an electrical connection 419 and electrical contact 418 (only one set is shown in FIG. 4). These electrical connections can be formed by depositing a conductive material onto the print array using traditional methods.

Figure 5:
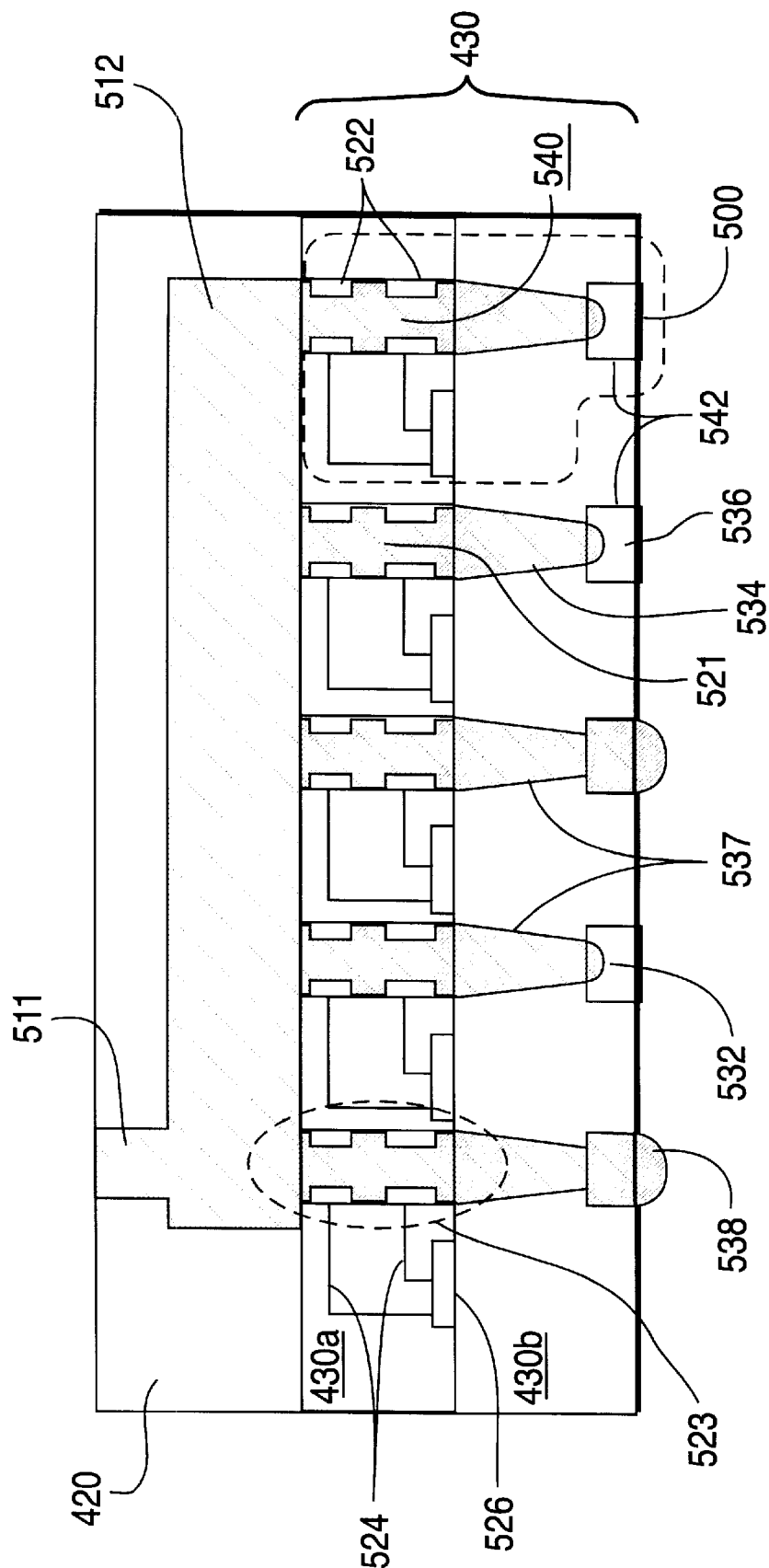
FIG. 5 illustrates a detailed sectional view of the distribution layer and the dispensing layer of the present invention.

FIG. 5 illustrates a detailed sectional view of the distribution layer 420 and the dispensing layer 430. More specifically, FIG. 5 illustrates a single microchannel 512 distributing a fluid to a plurality of dispensers 500. Distribution layer 420 comprises at least one feed 511 for receiving fluid from a reservoir (not shown).

Figure 6:
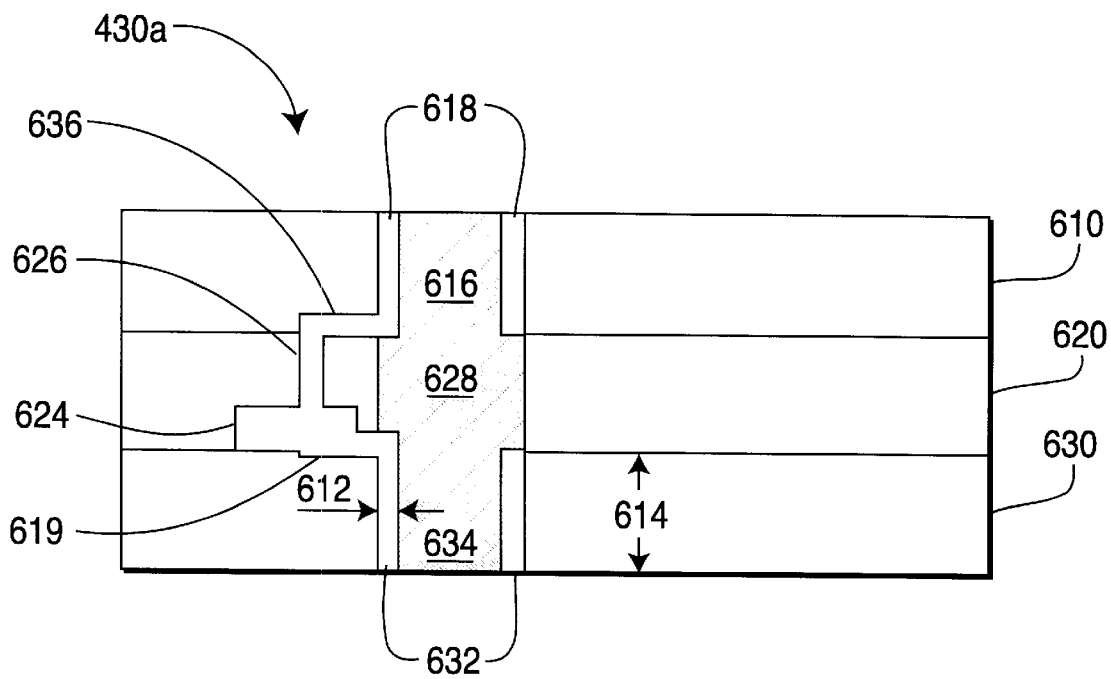
FIG. 6 illustrates one detailed embodiment of the dispensing layer.

In one embodiment, the dispensing layer 430 comprises a plurality of dispensers 500 implemented on two or more sublayers, 430a and 430b (See FIGS. 5 and 6). Each dispenser 500 may comprise a EHD micropump 523, a driver 526 and a dispensing channel 540. The EHD micropump 523 comprises a set of electrodes 522, which are coupled to the driver 526 via electrical contacts or connections 524. The driver 526, in turn, is electrically coupled to the printer interface module as discussed above. In this manner, the controller 210 is allowed to control the activation of the electrofluidic micropumps 523 for moving the fluids in the prefilled reservoirs onto the receptor surface.

Returning to FIG. 5, in one embodiment of the present invention, each of the dispenser 500 in the dispensing layer 430 includes a channel 540, that is comprised of three separate microchannel sections 521, 534 and 536. Section 521 is a substantially straight microchannel that carries the electrodes 522. Section 534 extends from section 521 and has a tapered end. In turn, section 536 which extends from section 534, has an opening that is designed to be slightly larger than that of the tapered end of section 534. This enlargement serves as a capillary break or capillary stop to prohibit the inadvertent flow of fluids from the section 534 into section 536. Namely, when a fluid is within a microchannel of capillary dimension, a meniscus (concave or convex)532 is typically formed. By employing an opening that is larger than the microchannel exit, the capillary force is sufficiently strong to stop the fluid from exiting the microchannel, thereby avoiding inadvertent discharge of fluid onto the receptor surface.

Optionally, using traditional masking technique, the sides 537 and 542 can be treated with a coating or seal. Namely, a suitable coating, e.g., a hydrophobic seal can be applied to the these sides to minimize lateral diffusion and/or to assist the micropump in stopping the flow of fluid (discussed below in FIG. 12). Depending on the material used, lateral diffusion may cause cross contamination between different reservoir/microchannel systems or may allow a fluid to inadvertently permeate to an unintended location on the surface of the receptor.

FIG. 6 illustrates one detailed embodiment of the dispensing sublayer 430a. More specifically, FIG. 6 illustrates one embodiment of the dispensing sublayer 430a that includes the section 521 of the dispensing layer having three layers, 610, 620 and 630. The thickness 614 of these layers is suitably about 100–1000 microns, but is preferably set at 500 microns. This embodiment illustrates one method of forming the microchannel section 521 and depositing the necessary EHD micropumps 523 and their associated electrical connections to form a portion of the dispensing layer 430. Traditional masking and etching techniques are used to form the microchannel section 521, the EHD micropumps 523 and their associated electrical connections (or formed using other techniques depending on the material used).

Within layer 610, a first electrode 618 is deposited along the side of a first portion 616 of the microchannel 521. The electrode 618 can be implemented in a number of different shapes and configurations.

In the preferred embodiment of the present invention, the electrode 618 consists of a conductive material deposited along the portion 616 of the microchannel, where the resulting electrode has the general shape of a ring. The diameter (thickness of the ring) 612 of the ring electrode is approximately 5–25 microns with a length of approximately 100–500 microns.

In a second embodiment, the micropump electrodes consist of an electrical conduit of electroplated gold that terminates as a "projection" (not shown). The length of the micropump electrode is about 10–50 microns with a diameter of about 50–100 microns. Thus, unlike the ring electrodes, the projection electrodes only extend from one side of the microchannel, whereas the ring electrodes are concentric with the microchannel.

Returning to FIG. 6, the first micropump electrode 618 is coupled to an electrical contact or connection 636 located on the bottom of layer 610. This electrical connection can be deposited onto layer 610. However, it should be understood that this electrical connection 619 can also be deposited onto layer 620 instead.

Layer 620 comprises a second portion 628 of the microchannel 521 and a driver 624. An electrical connection 626 is deposited onto layer 620, to couple the driver 624 to the electrical connection 636. In one embodiment, the driver is implemented using thin film transistors. The deposition of thin film transistors onto a substrate is well known in the art.

Within layer 630, a second electrode 632 is deposited along the side of a third portion 634 of the microchannel section 521. The portions, 616, 628 and 632 collectively form the microchannel section 521. Similar to layer 610, layer 630 includes an electrical connection 619 which is deposited on the top surface of layer 630. This electrical connection serves to couple the second electrode 632 to the driver 624. However, it should be understood that this electrical connection 636 can also be deposited onto layer 620 instead. Thus, the driver 624 is coupled to the first and second micropump electrodes 618 and 632 and is capable of receiving a control signal from the controller 210 via printer interface module 230 and activates the micropump 523 to cause fluid to flow from the reservoir to the receptor surface.

To form the device shown in FIG. 6, three distinct glass plates are needed. In each of plates 610, 620, and 630, holes are drilled to the same size and location on each plate so they line up as shown. This can be achieved using CAD drawings and computer control movement of parts on a high precision x-y table. Layers 610 and 630 need a conductive coating inside the holes, where the coating in 610 forms one electrode, and the coating in 630 forms the other. This is accomplished by depositing onto the surface of the plate and the interior of the holes a thin layer (100–1000A) of metal (Cr, Au, Pt, Al, or other) using sputtering or evaporating techniques. Using standard photolithography, the surface of the plate is masked while the holes are exposed, then holes are electroplated with more (2–10 $\mu$m) metal. The mask is removed, and the thin surface metal is removed by ion beam milling. The resulting structure has metal only inside the holes and nowhere else on the plate. Planar metal contacts 619 and 636 could be fabricated by first chemically etching a shallow recess (5–10 $\mu$m) in the glass as described above. The mask used to define the recesses would be left in place, thin film metal would be deposited into the recess followed by electroplating metal several microns-thick, and then the mask would be removed. A recessed structure enables a planar contact without interfering with the permanent bonding of plates. Alternatively, solder bumps and solder reflow techniques could be used instead of thin-film deposition and electroplating to form planar metal contact 636 and 619. Alternatively, thin-film conductive silicon could be used in place of metal in 619, 636, 618 and 632. Metal feedthroughs 626 could be fabricated as previously described. Alternatively, metal feedthroughs 626 combined with planar metal contact 636 could be simultaneously formed by thin-film depositing metal or silicon in the recess and through the hole 626 to from a continuous contact to the driver 624. Fabrication of the drivers 624 is based on well-established techniques. These drivers could be located on the top of the cassette, rather than embedded or recessed as shown, to simplify the overall construction. Contact from the drivers to the electrodes would be made through feedthroughs. Finally, it should be noted that the fabrication technique disclosed for FIG. 6 can be applied to the entire print array in general.

Figure 7:
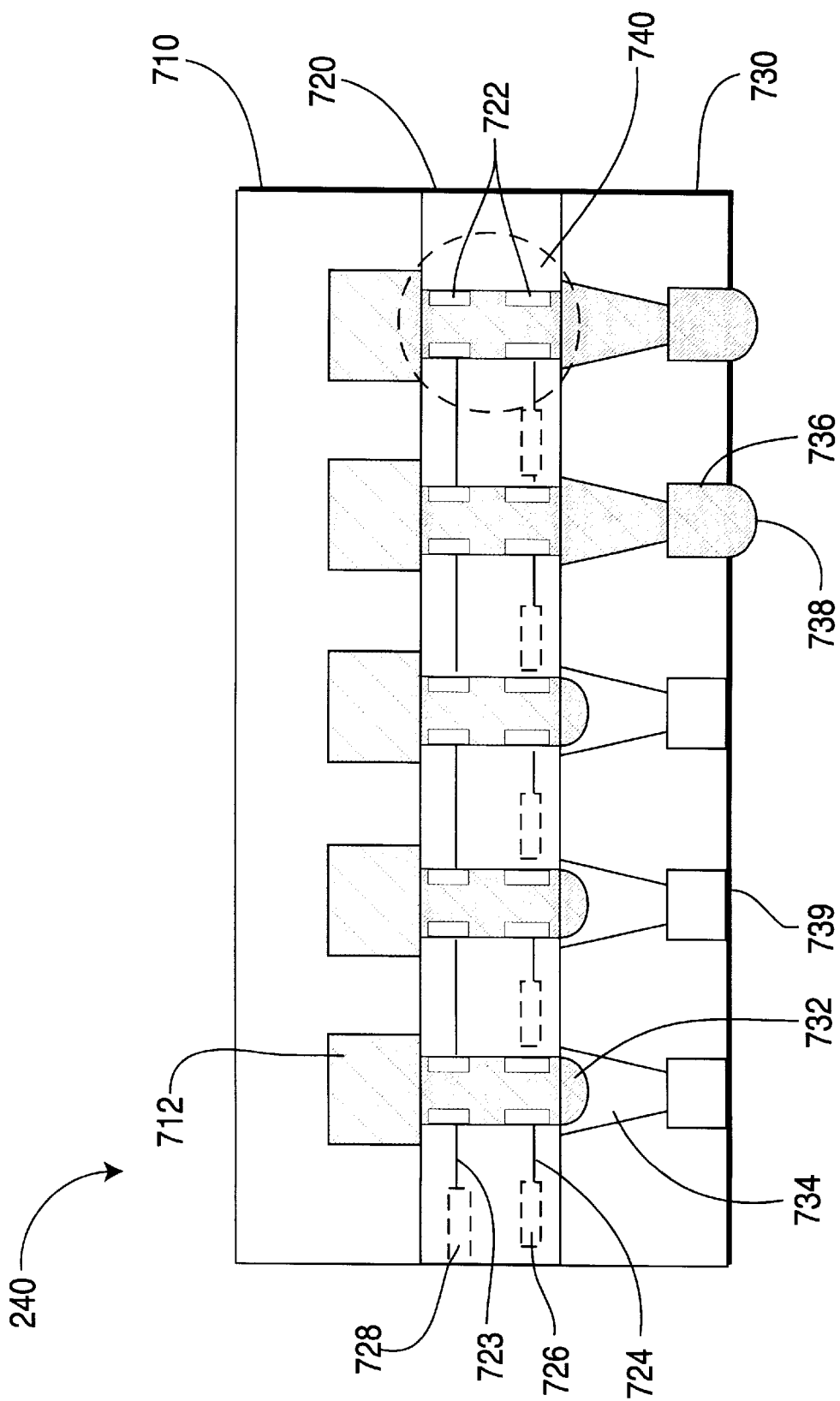
FIG. 7 illustrates various alternate embodiments of the print array.

FIG. 7 illustrates various alternate embodiments of the print array 240. First, the configuration of the drivers on the print array can be implemented using a linear array of drivers, e.g., one driver directly addressing one pump. However, for a large print array, many drivers are needed, and arranging the drivers in a two-dimensional matrix pattern is preferable.

The two-dimensional matrix of drivers and be accessed using a "grid like" printer interface module 320 as illustrated in FIG. 3. The driver access or connection points are located at the intersections between the vertical and horizontal lines.

However, for a large print array (in physical size or in greater density of surface locations) numerous drivers and driver access points are required. For example, a print array having 1000 surface locations requires 1000 drivers and 1000 driver access points. Thus, in one embodiment, the drivers 726 and 728 are implemented along the periphery of the print array 240 as shown dashed lines. Namely, electrical connection 724 for all micropumps in a row are coupled to a single driver 726, while all micropumps in a column are coupled to a single driver 728 via electrical connection 723. It should be noted that only one micropump 740 with electrodes 722 is illustrated per column since FIG. 7 illustrates a sectional view.

It should be noted that various methods of addressing these drivers in a matrix manner are disclosed in the patent application with Attorney Docket SAR 12564 filed concurrently herewith and incorporated herein by reference. These addressing methods may include passive and active addressing.

In a second embodiment, to reduce the cost and complexity of the print array, the drivers can be implemented on the printer 200 instead of the print array 240. Namely, the drivers can be implemented within the print array module 230, such that the drivers are only in electrical communication with the electrical connections 723 and 724 without having to be physically located on the print array 240. This alternate embodiment reduces cost and complexity by eliminating the drivers from the print array 240.

In a third embodiment, FIG. 7 illustrates a plurality of dedicated reservoirs 712 on reservoir layer 710. These reservoirs reduce cost and complexity in the print array 240 by reducing the complexity of the distribution layer 720. Namely, fewer number of microchannels are implemented, while the number of reservoirs is increased. It is more difficult to form a complex set of overlapping microchannels than to form additional reservoirs.

In a fourth embodiment, a second capillary break is implemented in section 734, thereby causing the formation of a meniscus 732 in layer 730. This additional capillary break increases the ability to finely control the flow of the fluid from each dispenser. Alternatively, section 734 can be omitted all together and section 736 can be coupled directly with the microchannel in distribution layer 720, thereby allowing a droplet 738 to be formed at opening 739 when the micropump 740 is activated.

Figure 8:
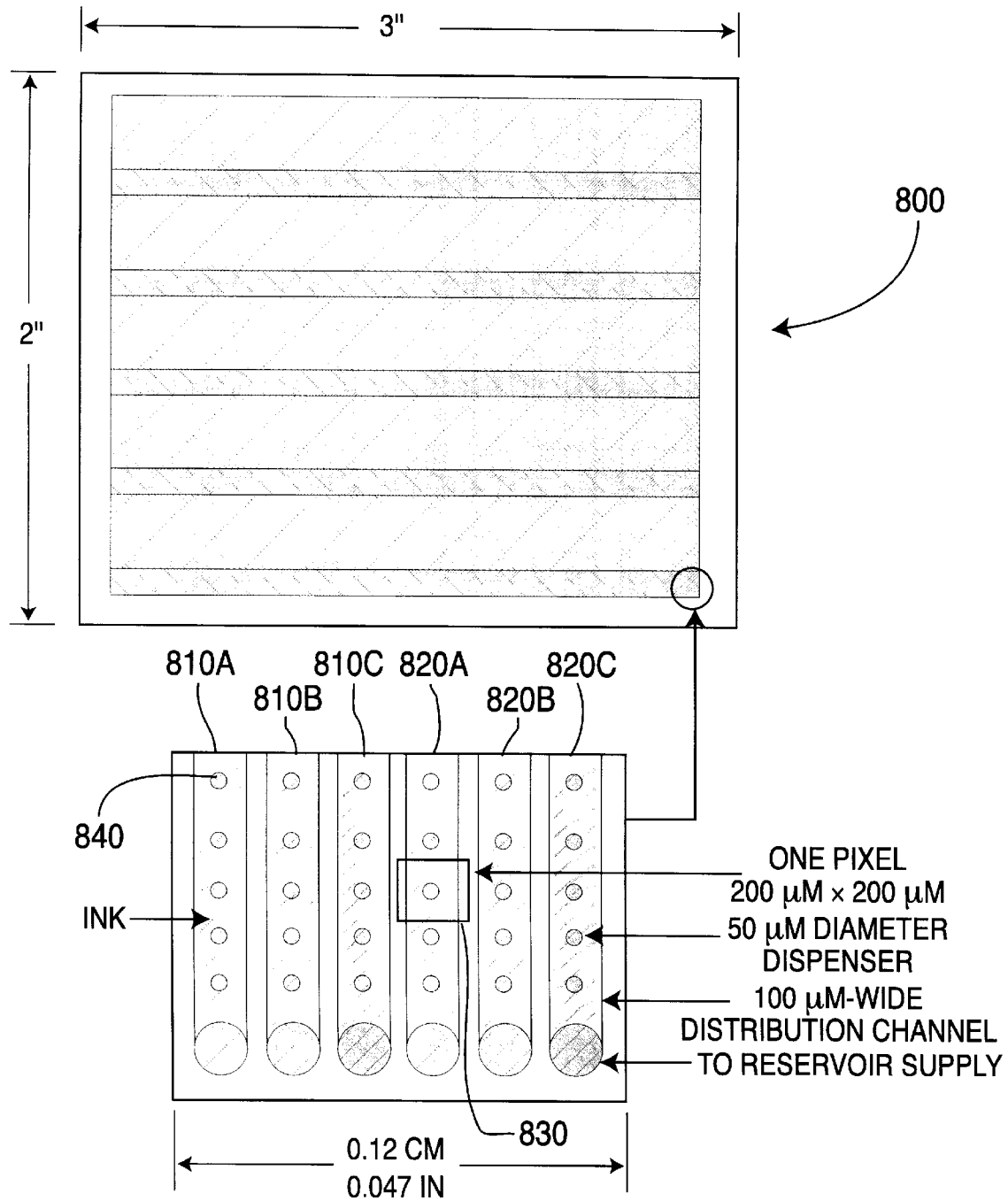
FIG. 8 illustrates a planar view of the distribution circuit just above the dispensers.

FIG. 8 illustrates a planar view 800 of the distribution circuit with an expanded view of the dispensers 840. In one embodiment, the droplet dispensers 840 are implemented as a two-dimensional planar array in which each column 810A–810C and 820A–820C is a linear array which dispenses only a single color of ink (e.g., red 810A and 820A, green 810B and 820B, or blue 810C and 820C) to all the pixels in that column. An enlarged view of this configuration is shown in the expanded view of FIG. 8. The pixel size 830 is approximately 200 μm×200 μm, which yields a density of $10^4$ pixels per square inch (100 dots per linear inch, or DPI). Each pixel dispenser 840 is approximately 50 μm in diameter. Droplets must have a volume sufficient to cover the entire 200 μm² pixel by diffusing over this region, with the appropriate density to yield the desired color. To print in any given pixel, the print array 240 makes three (3) sequential moves, dispensing and then blotting red, green, and blue droplets of the appropriate volume on the same pixel 830 to mix on the receptor and create the desired color. A 2"×3" dispensing array is shown in FIG. 8, but it should be understood that the array can be implemented in any size. To print a 2"×3" image, the print array needs to make only three sequential moving and blotting steps.

To make a larger print, the print array must make the corresponding number of moves, with the appropriate addressing to each dispenser to achieve the desired colors in pixels to be printed, as well as pixels already printed. This could be achieved by (i) turning "off" the dispensers that land on completed pixels; or by (ii) dispensing smaller droplets such that multiple RGB move and blot steps are needed to complete a pixel, and the number of steps corresponds to the overall moves needed to complete the entire print.

In an alternate embodiment, the pixel size is approximately the size of the dispenser. Namely, this second embodiment is similar to the first embodiment, and has essentially the same architecture. The primary difference is in the density of printed pixels, and the number of print array moves required to print the pixels. Here, dispensers 840 are also on the order of 50 μm in diameter, and on 200 μm centers. However, smaller droplet volumes and smaller step sizes enable a much higher resolution. Furthermore, in the first embodiment, the receptor, e.g., paper or film, must be designed to spread the droplets of ink over the entire pixel, whereas in this embodiment, no spreading is preferred, since the dispenser size is nearly the same size as the pixel. The preferred embodiment depends on which type of paper or film is employed.

Figure 9:
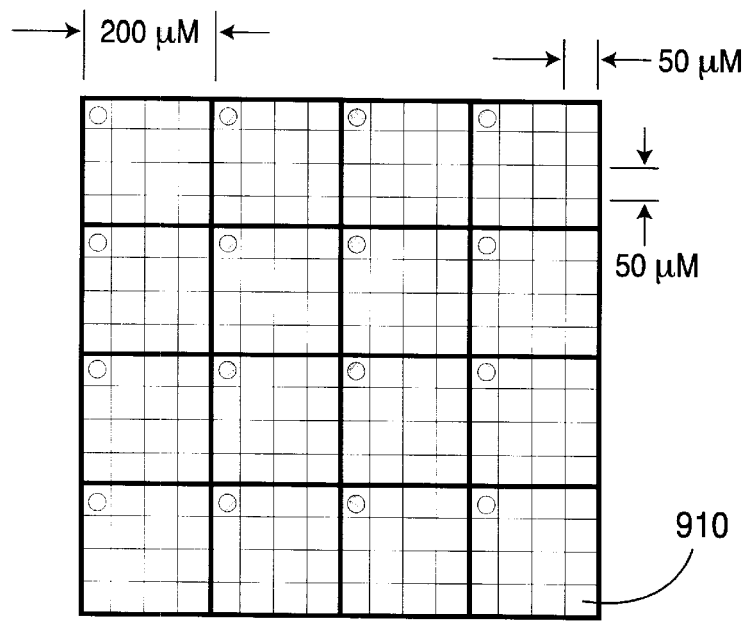
FIG. 9 illustrates a $1.6 \times 10^5$ pixels/sq. in. density (400 DPI) superimposed on a $10^4$ pixel density (100 DPI)
Figure 10:
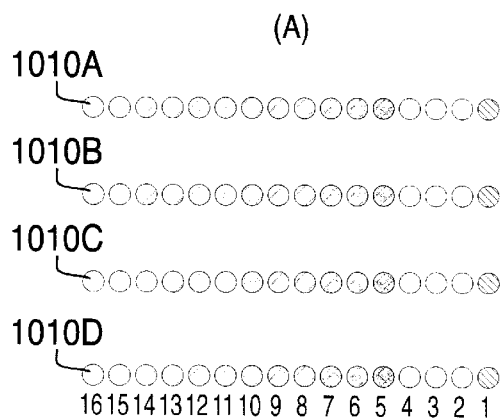
FIG. 10 illustrates the color pattern of the first four printing steps based on the density of FIG. 9, where no mixing of inks occurs in these first four steps.

More specifically, FIG. 9 illustrates a $1.6 \times 10^5$ pixels/sq. in. density (400 DPI) configuration superimposed on a $10^4$ pixel density (100 DPI) configuration, assuming a fluid dispensing area 910 of 50 μm. The first four printing steps are shown in FIG. 10, where no mixing of inks occurs in the first four steps. Namely, for each row 1010A–D, pixel locations 1–4 and 13–16 are red, pixel locations 5–8 are blue and pixel locations 9–12 are green.

Figure 11:
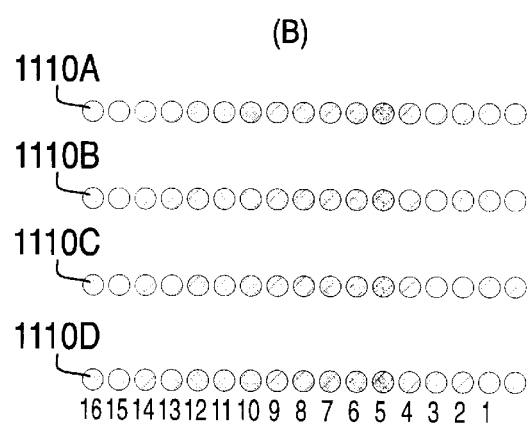
FIG. 11 illustrates a different color where some mixing occurred on the fifth step.

In contrast, FIG. 11 illustrates some mixing where on the fifth step, a first red pixel is mixed with a last green pixel (e.g., pixel location 12 having already received a green droplet, again receives a red droplet), for a print array moving towards the right. Twelve sequential horizontal steps are required to mix RGB in each pixel. This sequence is repeated three more time to complete the printing in the vertical direction, i.e., filling the spaces between the rows 1110A–1110D. Each step has a center to center spacing of 50 μm, and for the sake of illustration, the droplet from every dispenser is assumed to be of equal volume.

For example, equal parts of red and blue combine to form the color purple, as indicated by the $5^{th}$ pixel from the right in FIG. 11. Droplet dispensers on the leading and trailing edges of the print can be turned off to eliminate pixels, which are not part of the desired image. High resolution images, known as megapixel resolution ($10^6$ pixels/sq. in., or 1000 DPI) can be achieved by reducing the dispenser diameter 910 to 20 μm, and increasing the number of steps per horizontal line to 30.

As discussed above, integrated EHD pumps are used to activate the droplet formation at the exit of the dispenser. The length of pumping time is correlated with the droplet size. The red, green and blue droplet sizes are scaled according to the desired color in a given pixel.

Figure 12:
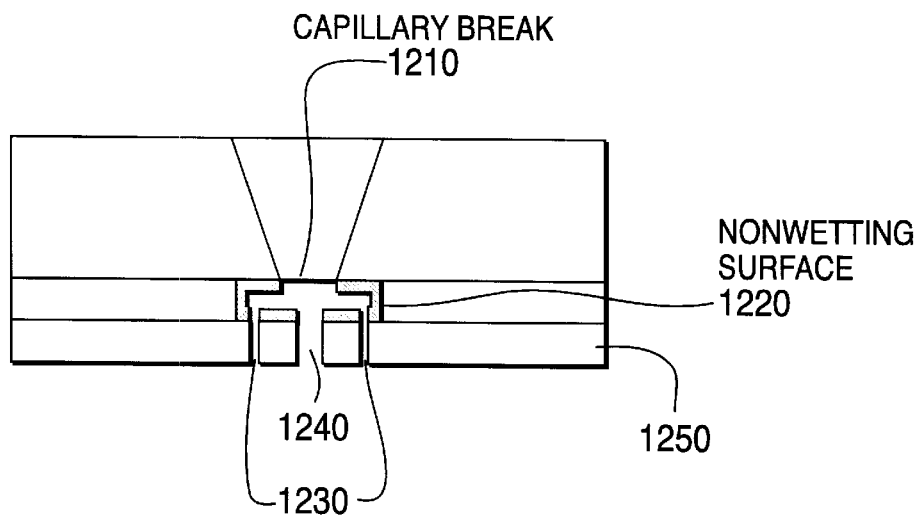
FIG. 12 illustrates a sectional view of an alternate embodiment to the droplet dispenser.

FIG. 12 illustrates a sectional view of an alternate embodiment to the droplet dispenser 1200 for a single pixel. An integrated passive valve, discussed above as a capillary break 1210, prevents the fluid from flowing past the region indicated by "capillary break" or "capillary stop". To commence fluid flow, EHD micropumps are activated with sufficient head pressure to force the fluid over the capillary stop. The droplet volume is formed in proportion to the length of pumping time. Inks can be characterized such that a known pumping time yields a known droplet size. When the desired droplet sizes are achieved, EHD micropumps are turned off, and the paper is brought into contact with the droplets. The paper absorbs the fluid droplets up to the exit of the capillary break.

Next, a mechanism is required to prevent the fluid from continuing to flow beyond the desired droplet size while in contact with the paper. Mechanisms to achieve this include, but are not limited to the use of reverse EHD pumping to create a fluid "back flow" and/or the use of a nonwetting surface 1220, e.g., a hydrophobic coating, at the exit of the capillary break.

In fact, an optional layer 1250 can be overlaid over the dispensing layer. This additional layer may incorporate air vents 1230 which allow air to freely flow into the capillary break area to allow the proper termination of fluid flow. Namely, as the droplet is absorbed from the aperture 1240, air is allow to flow into the capillary break area, functioning like pincers to terminate the fluid flow.

Figure 13:
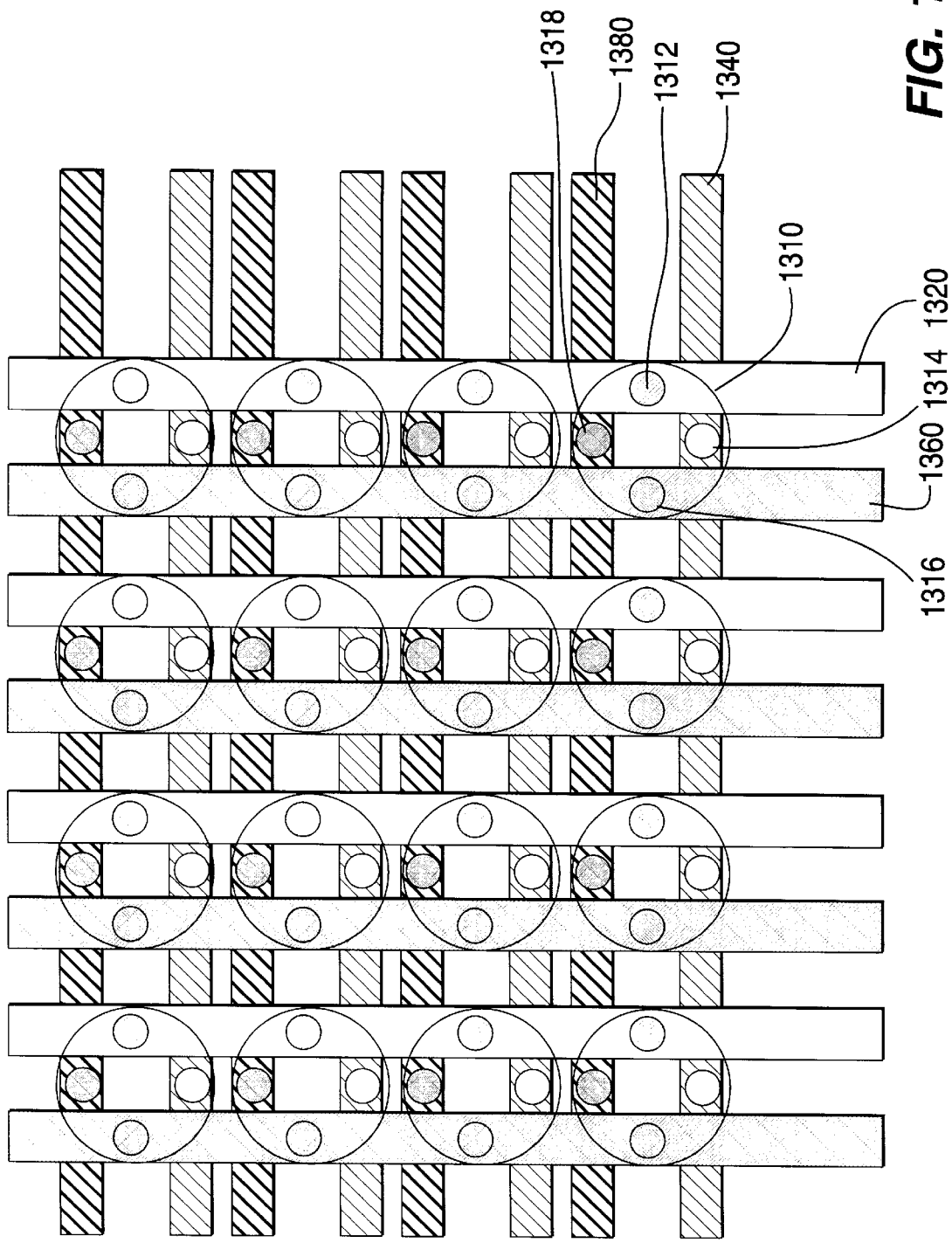
FIG. 13 illustrates another embodiment showing a planar view of the distribution circuit just above the dispensers.

FIG. 13 illustrates another embodiment showing a planar view 1300 of the distribution circuit just above the dispensers. In this embodiment, the top view illustrates the distribution circuit having a plurality of designated surface locations 1310. In this embodiment, each surface location 1310 can be representative of a pixel.

More specifically, FIG. 13 illustrates a surface location 1310 having a plurality of dispensers 1312, 1314, 1316, and 1318 which serve to provide a plurality of fluids to specific locations. Although FIG. 13 illustrates four dispensers, it should be understood that any number of dispensers can be employed depending on the requirement of a particular application. The plurality of dispensers 1312, 1314, 1316, and 1318 are coupled to a plurality of microchannels 1320, 1340, 1360, and 1380 respectively. These microchannels serve to provide fluids from a plurality of reservoirs (not shown) to a surface location 1310. Again, although FIG. 13 illustrates the microchannels 1320, 1340, 1360, and 1380 as providing fluids to a plurality of surface locations, it should be understood that a plurality of dedicated reservoirs can be implemented instead for each surface location, thereby avoiding the need to provide a complex system of distribution channels as shown in FIG. 13.

FIG. 13 illustrates an important aspect of the present print array, which is the ability to deliver a plurality of different color inks to a common location on the surface of the receptor. This ability allows color images to be printed without moving the print array. More specifically, each of the plurality of microchannels 1320, 1340, 1360, and 1380 can supply one of three primary colors, e.g., red, green and blue (RGB) or cyan, magenta and yellow (CMY), necessary to generate the full spectrum of visible colors. The fourth microchannel can optionally provide the color black. By injecting varying degrees of the fluids carrying pigments of the primary colors, each pixel can be controlled to produce a desired color to form a color image. The amount of various fluids to be introduced into a specific location can be controlled by the micropump within each microchannel. One method to implement such accurate dispensing of small amounts of fluid is disclosed in the SAR 12564 patent application.

It is to be understood that the apparatus and method of operation taught herein are illustrative of the invention. Modifications may readily be devised by those skilled in the art without departing from the spirit or scope of the invention.

What is claimed is:

1. A print array for delivering fluid to a receptor, said print array comprising:

first, second and third layers;

a reservoir in said first layer carrying a fluid;

a microchannel in said second layer, coupled to said reservoir;

a second microchannel in said third layer coupled to said first microchannel; and a micropump having two electrodes disposed along said second microchannel, where said micropump, responsive to a control signal applied to said two electrodes, causes said fluid to flow to a location, onto the receptor.

2. The print array of claim 1, wherein both of said reservoir and said microchannel carry said fluid.

3. The print array of claim 1 wherein said micropump is disposed along said second microchannel within a dispenser on said third layer.

4. The print array of claim 1, wherein said layers are constructed from glass.

5. The print array of claim 1, wherein said micropump is an electrohydrodynamic (EHD) pump.

6. The print array of claim 5, wherein said third layer includes first, second and third substrate layers, and wherein said EHD pump comprises:

a first ring electrode disposed within a first channel formed in the first substrate layer;

a second channel formed in the second substrate layer, wherein the second channel is coupled to the first channel; and a second ring electrode disposed within a third channel formed in the third substrate layer, wherein the third channel is coupled to said second channel.

7. The print array of claim 1, wherein said micropump comprises a set of ring electrodes.

8. The print array of claim 1, further comprising:

a driver, coupled to said micropump, for receiving said control signal to cause said fluid to flow.

9. The print array of claim 1, wherein said micropump is disposed along said second microchannel within a dispenser, said dispenser comprising a microchannel section hang an enlarged opening at which the fluid is dispensed, wherein the enlarged opening serves as a capillary break.

10. The print array of claim 9, wherein said microchannel section includes a tapered microchannel section having a narrow end proximate the enlarged opening and a wide end, said dispenser further comprising a second microchannel section having an opening smaller than the wide end of said tapered microchannel section and coupled thereto, wherein the opening of said second microchannel section serves as a capillary break.

11. A print array for delivering fluids to a receptor, said print array comprising:

a plurality of reservoirs in a first layer;

one or more first microchannels in a second layer, coupled to each of said plurality of reservoirs, where said plurality of reservoirs and said first microchannels carry one or more types of fluids;

one or more second microchannels in a third layer, coupled to each of said first microchannels, where said second microchannels carry the one or more types of fluids; and a plurality of micropumps in said third layer, where each of said plurality of micropumps has a pair of electrodes disposed along one of said second microchannels, where said micropumps, responsive to one or more control signals applied to each of said pairs of electrodes, cause the one or more types of fluids to flow to a specific location on a surface of the receptor.

12. The print array of claim 11, wherein said specific location comprises a pixel location.

13. The print array of claim 11 wherein said micropumps are disposed along each said second microchannel within dispensers on said third layer.

14. The print array of claim 11, wherein said micropumps are electrohydrodynamic (EHD) pumps.

15. The print array of claim 14, wherein said third layer includes first, second and third substrate layers, and wherein each of said EHD pumps comprises:

a first ring electrode disposed within a first channel formed in the first substrate layer;

a second channel formed in the second substrate layer, wherein the second channel is coupled to the first channel; and a second ring electrode disposed within a third channel formed in the third substrate layer, wherein the third channel is coupled to said second channel.

16. The print array of claim 11, wherein each of said micropump comprises a set of ring electrodes.

17. The print array of claim 11, wherein each of said micropump is an electro-wetting pump.

18. The print array of claim 11, further comprising:

a plurality of drivers, where each of said drivers is coupled to at least one of said micropumps, for receiving said control signal to cause said fluids to flow.

19. The print array of claim 11, wherein each of said micropumps is disposed along said second microchannel within a dispenser, each said dispenser comprising a microchannel section having an enlarged opening at which the fluid is dispensed, wherein the enlarged opening serves as a capillary break.

20. The print array of claim 19, wherein said microchannel section includes a tapered microchannel section having a narrow end proximate the enlarged opening and a wide end, said dispenser further comprising a second microchannel section having an opening smaller than the wide end of said tapered microchannel section and coupled thereto, wherein the opening of said second microchannel section serves as a capillary break.

21. The print array of claim 19, wherein said microchannel section having an opening is coated with a hydrophobic coating.

22. A method of fabricating a print array, said method comprising the steps of:

(a) forming a reservoir on a first substrate for storing a fluid;

(b) forming a microchannel on a second substrate coupled to said reservoir;

(c) forming a second microchannel on a third substrate coupled to said first microchannel;

(d) forming a pair of electrodes disposed along said second microchannel; and (e) providing connections to said pair of electrodes to form a micropump, where said micropump, responsive to a control signal applied to said pair of electrodes, causes said fluid to flow onto a receptor.

23. The method of claim 22, wherein said third substrate comprises a plurality of layers constructed from glass.

24. A printer for moving fluids onto a receptor, said printer comprising;

a controller;

an interface module coupled to said controller; and a print array, coupled to said interface module, said print array comprising:

a reservoir on a first layer carrying said fluids;

a first microchannel on a second layer, coupled to said reservoir; and a micropump having two electrodes disposed on a third layer along a second microchannel coupled to said first microchannel, where said micropump, responsive to a control signal from said controller applied to said two electrodes, causes said fluid to flow to a location on the receptor.

25. The printer of claim 24, wherein said micropump is an electrohydrodynamic (EHD) pump.

\* \* \* \* \*